Feb. 6, 1951 S. E. HILBLOM 2,540,263
MOWER FRAME CONSTRUCTION
Original Filed Oct. 18, 1943 2 Sheets-Sheet 1

INVENTOR.
SAMUEL E. HILBLOM
BY Paul O. Pippel
ATTORNEY

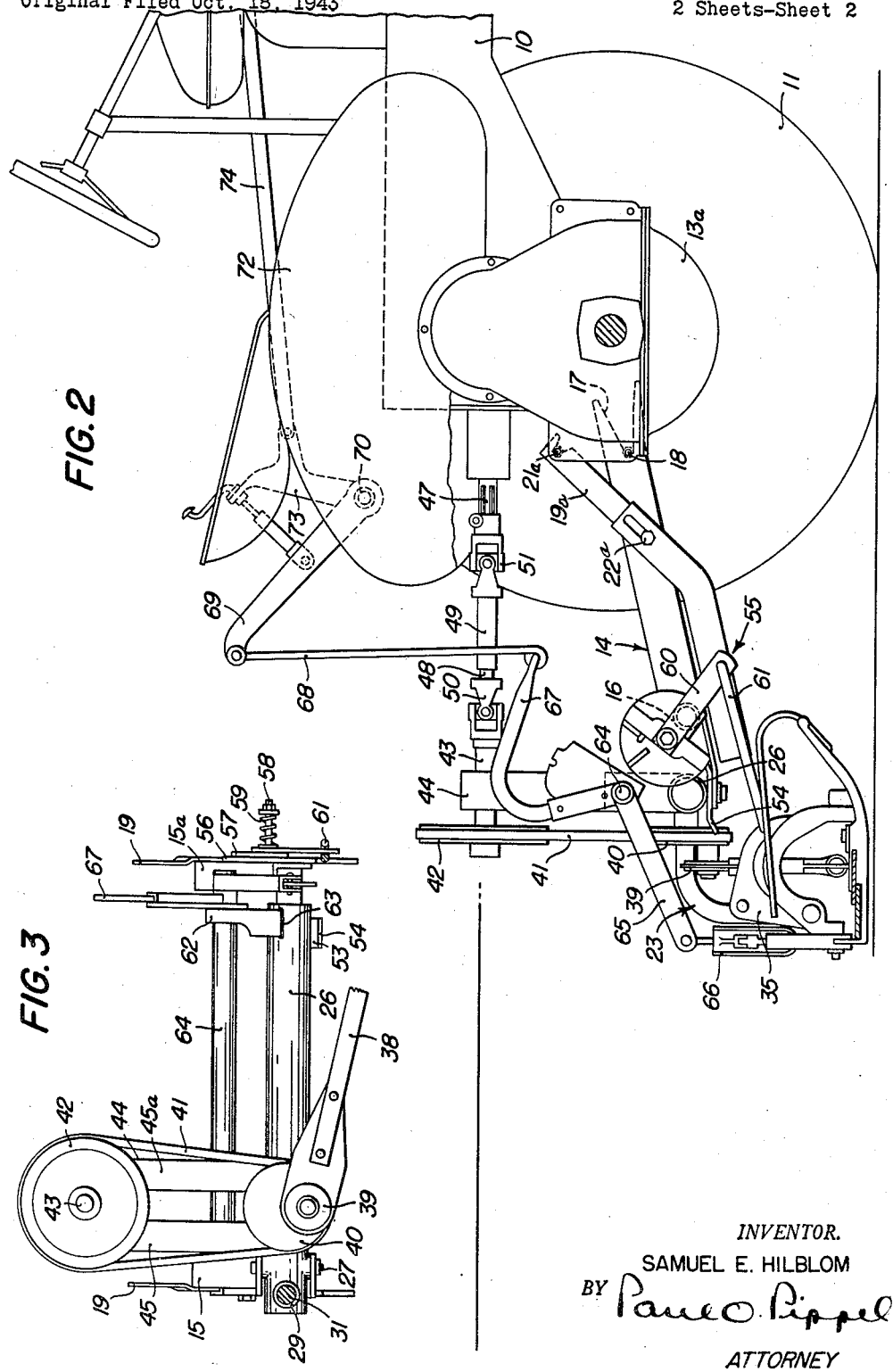

Patented Feb. 6, 1951

2,540,263

UNITED STATES PATENT OFFICE 2,540,263

MOWER FRAME CONSTRUCTION

Samuel E. Hilblom, Chicago, Ill., assignor to International Harvester Company, a corporation of New Jersey Original application October 18, 1943, Serial No. 506,661. Divided and this application May 9, 1947, Serial No. 747,037

6 Claims. (Cl. 56—25)

This application is a division of my co-pending application, Serial Number 506,661, filed October 18, 1943, now Patent Number 2,454,697 of November 23, 1948.

This invention relates to a mower, and more particularly to an improved mower frame construction.

The invention is primarily concerned with and has for a principal object the provision of an improved simplified form of mower frame construction particularly adapted for direct connection to the rear of a tractor or other supporting vehicle. It is a further object of the invention to construct the mower frame of relatively few frame members, relying principally upon tubular members to impart the desired strength and rigidity thereto. Other objects and features of the invention will become apparent as the disclosure is more fully made in the following detailed description taken in conjunction with the accompanying sheets of drawings, in which:

Fig. 2 is a side elevational view of the same;

Fig. 3 is a transverse sectional view of the mower frame taken substantially on the line 3—3 of Fig. 1.

Figure 1:
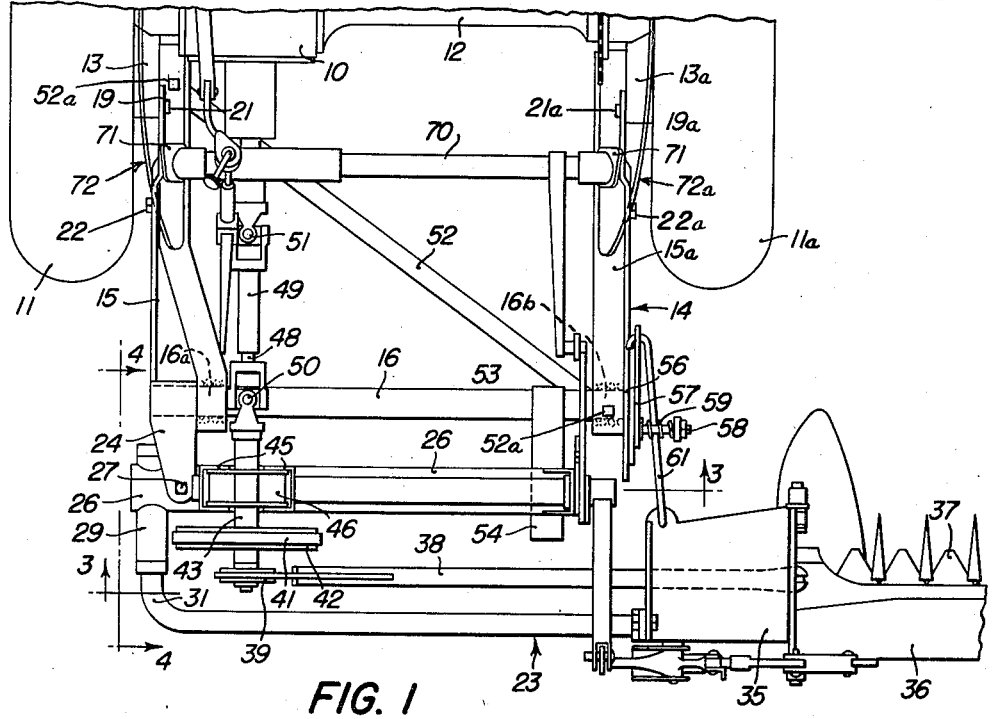
Fig. 1 is a plan view of the rear portion of a tractor-mounted mower.

Although the disclosure will pertain to the detailed structure of the mower frame and its adaptation to a tractor, the invention has wider applicability and it is not intended that the scope thereof be limited by the detailed structure set forth.

The tractor mower chosen for the purpose of illustration includes a tractor having a main body 10, carried on rear traction wheels 11, 11a and front wheels (not shown). The rear wheels 11, 11a are driven from the source of power on the vehicle through driving mechanism contained in a transverse rear axle structure 12 having at opposite sides thereof depending housings 13, 13a. These housings serve as means for the attachment thereto of a mower carrying or supporting frame designated generally by the numeral 14.

This frame comprises a pair of longitudinally rearwardly extending side frame members 15, 15a cross-connected adjacent their rear ends by a transverse tubular member 16, the opposite ends of which are preferably welded to the side members 15, 15a. The side members 15 and 15a are provided at their forward ends with notches 17 and are connected to the housings 13 and 13a by means of attaching bolts 18 as shown in Figure 2.

The frame 14 is further supported on the depending housings 13 and 13a of the tractor by brace members 19 and 19a secured to the housings and frame at 21 and 22, and 21a and 22a, respectively. The particular manner of connecting the frame 14 to the tractor forms no detailed part of the present invention, being disclosed and claimed in my co-pending application, Serial Number 506,661, now Patent Number 2,454,697, referred to above.

Figure 4:
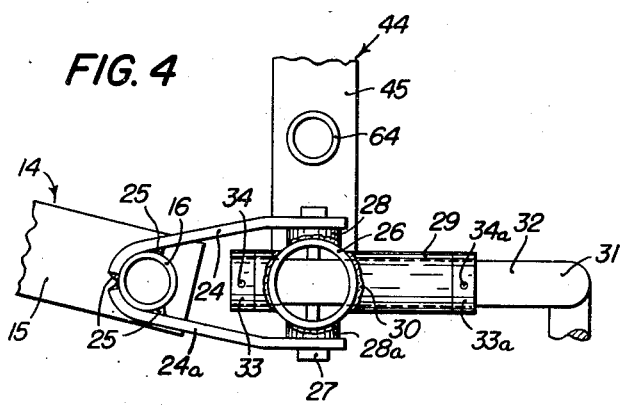
Fig. 4 is an enlarged fragmentary view of the structure viewed along the line 4—4 of Fig. 1.

At its left-hand rear corner the frame 14 includes means for supporting a cutting mechanism frame designated generally by the number 23. The transverse tubular member 16 carries at its left-hand end a pair of vertically spaced longitudinally rearwardly extending supporting members in the form of straps 24 and 24a. These straps are preferably welded as at 25 to the member 16. The free or rear ends of the straps are vertically spaced apart and have positioned therein a transverse tubular member 26 (Fig. 4). A vertical pivot pin 27 passes through the ends of the straps 24, 24a, through the end of the tubular member 26, and through a pair of spacers 28 and 28a. The short tubular bearing member 29 is welded as at 30 to the left-hand end of the tubular member 26 and provides a bearing on a longitudinal horizontal axis for a coupling bar 31, the inner or stubbleward end of which, as at 32, is carried in the bearing 29 and is held in place by collars 33 and 33a and pins 34 and 34a.

The coupling bar 31 extends to the right and may have mounted at its outer end conventional cutting mechanism consisting of a yoke 35, cutter bar 36, and knife 37. The knife is driven by a pitman 38 connected at its inner or stubbleward end to an eccentric 39 on a lower or driven pulley 40. The pulley 40 is driven by a belt 41 from a driving pulley 42 which is in turn carried on a shaft 43 journaled in a support or bearing 44 on the cutting mechanism frame 23. The support 44 preferably comprises a pair of upstanding brackets 45, 45a in the form of channels, at the upper end of which is carried a bearing member 46 through which the shaft 43 extends. The shaft 43 is vertically spaced above the transverse tubular member 26 and is in horizontal longitudinal aligment with a power take-off shaft 47 of the tractor. The shaft 47 may be of conventional construction insofar as the means for driving the same are concerned and it is not necessary to illustrate or describe the details thereof here. The shafts 43 and 47 are connected by a pair of telescopic shaft sections 48 and 49. The former is connected by a universal joint 50 to the shaft 43 and the latter is connected by a universal joint 51 to the power take-off shaft 47.

The frame 14 is additionally braced by a diagonal brace 52 which extends across the side frame members 15 from the front end of the left frame member to the rear end of the right frame member. The brace 52 is rigidly fastened to the frame members 15, 15a by bolts 52a and 52b, respectively.

The transverse tubular member 16 of the carrying frame 14 has rigidly secured thereto adjacent its right-hand end a rearwardly extending supporting member 53. This member has its rear end bent downwardly as at 54 (Fig. 2) to serve as a guide for the tubular member 26 as the cutting mechanism frame 23 moves longitudinally rearwardly about the pivot pin 27, as when the cutting mechanism swings rearwardly in response to force applied thereto when the cutter bar 36 strikes an obstruction; and when the cutting mechanism is returned to its forward position for reconnection to the tractor. When the cutting mechanism is operating, it is in the position shown in Fig. 1 and the tubular member 26 is supported at its right-hand end on the member 53. It will be noted that the tubular member 26 is supported upon member 16 solely by member 53 on one end, and pivot pin 27 and straps 24, 24a on the opposite end.

The position of the cutting mechanism with respect to the carrying frame 14 is maintained by release mechanism indicated generally by the numeral 55. This mechanism consists generally of a pair of cam plates 56 and 57. The former is rigidly carried by the right-hand frame member 15a, and the latter is relatively angularly movable about a short shaft or stud 58 extending to the right from the cam plate 56. Means including a compression spring 59 normally maintains the plates in engagement and against relative movement. The plate 57 is connected by an arm 60 to a link 61 which is in turn connected to the yoke 35 of the cutting mechanism frame 23. When the cutter bar 36 strikes an obstruction, the cutting mechanism frame pulls on the link 61 and tends to rotate the cam plate 57 with respect to the cam plate 56, thus allowing the cutting mechanism frame to swing rearwardly about the vertical pivot 27. When the obstruction has been eliminated, the cutting mechanism frame 23 may be restored to its operating position, whereupon the cam plates 56 and 57 are reengaged.

The cutting mechanism frame further includes an upstanding bracket 62 welded as at 63 to the right-hand end of the tubular member 26 (Fig. 3). This bracket provides a bearing for the right-hand end of a transverse tubular rock shaft 64, the inner end of which is journaled in suitable bearings in the upstanding channels 45, 45a of the support or bracket 44. The outer or right-hand end of the rock shaft 64 may be connected by any suitable linkage, as at 65 and 66, to the cutter bar 36 and is operative to raise and lower the cutter bar. The rock shaft 64 is further connected by an arm 67, link 68, and arm 69 to a second transverse rock shaft 70. The opposite ends of the rock shaft 70 are carried in suitable bearings 71 in appropriate supporting structure, herein illustrated as the fenders of the vehicle and designated generally by the numerals 72 and 72a. The rock shaft 70 may be operated by suitable power mechanism (not shown) on the tractor and may be connected thereto by an arm 73 and forwardly extending rod 74. The mechanism for raising and lowering the cutter bar forms no part of the present invention and the mechanism herein illustrated may be replaced by any other type.

It will be seen from the foregoing description that the mower frame structure is relatively simple, is light weight, and is of sturdy construction. The frame structure lends itself readily to attachment to the tractor, as by the means shown in my co-pending application, Serial Number 506,661, now Patent Number 2,454,697.

Other advantages of the frame structure will appear to those skilled in the art, as will various modifications and alterations of the detailed structure set forth, all of which may be made without departing from the spirit and scope of the invention as set forth in the appended claims.

What is claimed is:

1. A mower frame comprising: a pair of longitudinally running, transversely spaced apart frame members; a first tubular member extending transversely across, and having its opposite ends rigidly connected respectively to the frame members; a second tubular member parallel to the first tubular member and having its opposite ends respectively adjacent the ends of the frame members; a vertical pivot means connecting one end of the second tubular member to the first tubular member for movement of the second tubular member from a first position adjacent the first tubular member to a second position remote from the first tubular member; support means rigidly connected to one tubular member and engageable with the other tubular member, said vertical pivot means and said support means combining to constitute the sole support of said one tubular member on the other when the second tubular member is in its first position; and said support means further including a portion adapted to guide the second tubular member during at least the final phase of its movement as it returns from its second position to its first position.

2. The invention set forth in claim 1, in which: the second tubular member carries a pair of transversely spaced upstanding brackets; and a third tubular member is supported by the brackets.

3. The invention set forth in claim 1, in which: the vertical pivot means also includes a longitudinal horizontal pivot; and a coupling bar is connected to the horizontal pivot means.

4. The invention set forth in claim 1, in which: the vertical pivot means pivoting the second tubular member to the first tubular member includes a pair of vertically spaced apart straps, one end of each of which partially embraces the first tubular member and is rigidly secured thereto, the other ends of the straps being connected to the second tubular member by the vertical pivot.

5. In a tractor-mower in which the tractor includes a longitudinal main body having means including a power take-off shaft and in which the mower is of the type directly connected to the tractor: a mower comprising a supporting frame including a generally U-shaped structure having the legs of the U formed by a pair of longitudinal, transversely spaced apart members and the bight of the U is formed by a transverse tubular member connected at its opposite ends to the longitudinal members; means on the longitudinal members for attaching the supporting frame to the tractor at a height below the tractor power take-off; a cutting mechanism frame carried by the supporting frame and including a second transverse tubular member generally paralleling the first tubular member; means including a pivot on a vertical axis connecting one end of the second tubular member to the supporting frame; means releasably supporting the other end of the second tubular member on the supporting frame; and means on the second tubular member including a pair of upstanding brackets adapted to support driving mechanism for the mower at a height generally coincident with the tractor power take-off.

6. The invention set forth in claim 5, in which: another upstanding bracket is mounted on the second tubular member; and a third transverse member parallels the second tubular member and is carried by said bracket and the aforesaid pair of brackets.

SAMUEL E. HILBLOM.

REFERENCES CITED

The following references are of record in the file of this patent:

UNITED STATES PATENTS

| Number | Name | Date |
| --- | --- | --- |
| 2,269,982 | Mott | Jan. 13, 1942 |
| 2,331,863 | Schroeppel | Oct. 12, 1943 |
| 2,495,986 | Schroeppel | Jan. 31, 1950 |